(12) United States Patent
Witt et al.

(10) Patent No.: US 10,875,713 B2
(45) Date of Patent: Dec. 29, 2020

(54) METHOD FOR TECHNICALLY SUPPORTING A MANUAL ORDER PICKING PROCESS

(71) Applicant: Ubimax GmbH, Bremen (DE)

(72) Inventors: Hendrik Witt, Bremen (DE); Jan Junker, Wiesbaden (DE)

(73) Assignee: Ubimax GmbH, Bremen (DE)

( * ) Notice: Subject to any disclaimer, the term of this patent is extended or adjusted under 35 U.S.C. 154(b) by 122 days.

(21) Appl. No.: 16/081,719

(22) PCT Filed: Mar. 4, 2016

(86) PCT No.: PCT/EP2016/054643
§ 371 (c)(1),
(2) Date: Aug. 31, 2018

(87) PCT Pub. No.: WO2017/148532
PCT Pub. Date: Sep. 8, 2017

(65) Prior Publication Data
US 2019/0077599 A1    Mar. 14, 2019

(51) Int. Cl.
*G06F 7/00* (2006.01)
*B65G 1/137* (2006.01)
(Continued)

(52) U.S. Cl.
CPC ........... *B65G 1/1373* (2013.01); *B65G 1/137* (2013.01); *G06F 1/163* (2013.01);
(Continued)

(58) Field of Classification Search
None
See application file for complete search history.

(56) References Cited

U.S. PATENT DOCUMENTS 7,504,949 B1    3/2009  Rouaix et al.
2010/0271187 A1  10/2010 Uysal et al.
(Continued)

FOREIGN PATENT DOCUMENTS

EP    1630716 A1    3/2006
EP    2161219 A1    3/2010

OTHER PUBLICATIONS

International Search Report issued in Internation Patent Application No. PCT/EP2016/054643 dated Jan. 4, 2017.

*Primary Examiner* — Yolanda R Cumbess
(74) *Attorney, Agent, or Firm* — Arent Fox LLP (57) ABSTRACT

An aspect of the invention pertains to technically supporting a manual order picking process. A user executes order picking steps, which are output to the user as handling instructions. The handling instructions originate from a management server. One or more order picking steps specify the removal and/or depositing of objects in a storage location by the user. A sensor device in a mobile unit acquires sensor data, based on which the effected execution of a respective order picking step is determined. The mobile unit is carried on an arm, hand, foot, or leg of the user with a fastening means. Data that is based on the sensor data of the sensor device is transmitted via a wireless data interface, whereupon the management server is informed of the effected execution of the respective order picking step. Information on the manual order picking process is output to the user by data glasses.

17 Claims, 3 Drawing Sheets

(51) Int. Cl.
*G06Q 10/08* (2012.01)
*G06K 7/10* (2006.01)
*G06F 1/16* (2006.01)

(52) U.S. Cl.
CPC ....... *G06K 7/10128* (2013.01); *G06Q 10/087* (2013.01); *B65G 1/1375* (2013.01); *B65G 2209/04* (2013.01)

(56) References Cited

U.S. PATENT DOCUMENTS

| | | | |
|---|---|---|---|
| 2014/0214631 A1* | 7/2014 | Hansen | G06K 7/10366 705/28 |
| 2015/0186728 A1 | 7/2015 | Kimura | |
| 2015/0192774 A1* | 7/2015 | Watanabe | G06Q 10/087 345/8 |
| 2016/0057565 A1* | 2/2016 | Gold | H04W 4/80 455/41.1 |
| 2017/0059867 A1* | 3/2017 | Tanaka | G06K 7/10891 |
| 2017/0337506 A1* | 11/2017 | Wise | G06Q 10/087 |

* cited by examiner

METHOD FOR TECHNICALLY SUPPORTING A MANUAL ORDER PICKING PROCESS

CROSS-REFERENCE TO RELATED APPLICATION

This application is a 35 U.S.C. 371 National Phase of PCT Application No. PCT/EP2016/054643 filed Mar. 4, 2016. The disclosure of the prior application is hereby incorporated by reference herein in its entirety.

FIELD

The invention pertains to a method and a system for technically supporting a manual order picking process.

BACKGROUND

In the course of manual order picking processes, objects are respectively removed from storage locations or deposited in storage locations by a user or order picker. Different approaches for supporting the user in executing the manual order picking process by means of technical devices are known from the prior art.

When an order picking process is supported by means of Pick-by-Light, a display at the storage locations of the objects informs the order picker of how many objects he has to remove from or deposit in the respective storage location. The removal or depositing operation is respectively confirmed by the order picker at the storage location, e.g. with a keystroke, and the inventory change is subsequently fed back to a management system.

In an order picking process supported by means of Pick-by-Voice, the order picker receives instructions for removing or depositing objects from/in storage locations with the aid of an acoustic output device.

In an order picking process based on Pick-by-Vision, visual information on the order picking process is displayed to the order picker in his field of vision with the aid of a head-mounted visual output device. This output device is frequently also referred to as data glasses or an HMD (HMD=Head-Mounted Display). A sensor system in the data glasses, e.g. a camera, detects the environment of the order picker. If applicable, objects to be picked can also be detected in this way.

Publication EP 2 161 219 B1 describes a method for the visual support of manual order picking processes, in which the order picker carries along a mobile unit. This mobile unit communicates with a stationary EDP system and comprises an optical display device, as well as an optosensory detection device. Current target objects of an order picking process are detected by means of the optosensory detection device. Navigation information for the target object to be picked is displayed to the order picker with the aid of the display device. In a special embodiment, the mobile unit refers to data glasses.

Order picking solutions based on Pick-by-Vision are very convenient for the order picker. However, they have the disadvantage that objects to be picked are frequently not correctly detected due to the distance of the data glasses from the objects.

SUMMARY

An aspect of the invention is based on the objective of developing a particularly reliable method for technically supporting a manual order picking process.

This objective may be attained with the method according to claim 1 and the system according to claim 16. Aspects of the invention are further defined in the dependent claims.

An aspect of the inventive method serves for technically supporting a manual order picking process. In this context, the term order picking process should be interpreted in a broad sense and may concern the order picking (i.e. the depositing and removal) of objects in arbitrary fields of applications, e.g. in the fields of logistics, production, maintenance and servicing.

In the course of a manual order picking process, a user or order picker respectively executes order picking steps that are output to the user in the form of handling instructions. The handling instructions originate from a management server for managing the manual order picking process and are stored therein in the form of digital data. In this context, the management server represents a central computer, by means of which the manual order picking process of the user and, if applicable, also order picking processes of other users can be managed. The management server preferably is a stationary computer. One or more of the aforementioned order picking steps respectively specify the removal of one or more objects from at least one storage location by the user. Alternatively or additionally, one or more order picking steps respectively specify the depositing of one or more objects in at least one storage location by the user.

In an aspect of the inventive method, sensor data is acquired by a sensor device, particularly a contactless sensor device, in a mobile unit of a number of mobile units. If applicable, the number of mobile units may also represent only one single mobile unit, which in this case is the mobile unit acquiring the sensor data. The effected or completed execution of the respective order picking step is determined based on the sensor data. In this case, the determination of an effected execution of a respective order picking step is implemented by determining, based on the sensor data of the sensor device, that and, if applicable, how many objects are respectively removed from or deposited in a corresponding storage location. The executed order picking step being determined should be the pending or, if applicable, one of the pending order picking steps according to the handling instructions. In this context, it has to be taken into account that the handling instructions may, if applicable, give the user some freedom with respect to the sequence, in which a certain number of pending order picking steps can be executed. If the order picking step is incorrectly executed by the user or if the sensor data is corrupt, the respective order picking step, the effected execution of which is determined, can also deviate from the corresponding pending order picking step.

According to an aspect of the invention, a respective mobile unit of the number of mobile units is carried on an arm or on a hand (preferably on the wrist or the back of the hand) or on a foot or on a leg of the user by means of a fastening means of the respective mobile unit. Consequently, one or more mobile units fastened on the arm/hand or foot/leg can be used. According to their intended use, the mobile units are therefore configured for being fastened on the aforementioned extremities. The fastening means may be designed arbitrarily and comprise, e.g., a closure or a strap. If applicable, the fastening means may be entirely or partially formed by the housing of the mobile unit.

In an aspect of the inventive method, data based on the sensor data of the sensor device is transmitted via a wireless data interface of the mobile unit, whereupon the management server is informed of the effected execution of the respective order picking step. If a user carries multiple mobile units, each of these units can be used for acquiring the sensor data and for transmitting the data via the wireless interface. If applicable, the sensor devices or the data interfaces in the individual mobile units may be configured differently in this case.

According to an aspect of the invention, the effected execution of a respective order picking step can be determined in different components. In one variant, the effected execution of a respective order picking step is determined directly in the mobile unit that has also acquired the sensor data. In this case, the transmitted data, which is based on the sensor data of the sensor device, represents the information on the effected execution of the respective order picking step. This information can be transmitted after each order picking step, but also after the execution of multiple order picking steps. The data based on the sensor data of the sensor device therefore can generally be transmitted via the wireless interface after each order picking step or, if applicable, after the execution of multiple order picking steps.

If the effected execution of a respective order picking step is not determined in the mobile unit, the sensor data itself is transmitted as the data that is based on the sensor data. This sensor data can then be forwarded to the management server, which determines the effected execution of a respective order picking step based on the received data.

In an aspect of the inventive method, information on the manual order picking process is furthermore output to the user in an at least partially visual and optionally also acoustic and/or tactile manner by means of data glasses. The term data glasses may be interpreted as a synonym for a head-mounted visual display device, wherein the data glasses may optionally also comprise, if applicable, acoustic and/or tactile output units. If applicable, data glasses may also be implemented in the form of one or two contact lenses that are worn by the user and make it possible to visually display information to the eye or the eyes of the user. It is preferred that the data glasses output the handling instructions, which are transmitted from the management server to the data glasses in the form of digital data. In this case, the handling instruction to be currently executed is preferably output simultaneously with one or more ensuing handling instructions. If applicable, the handling instructions may also be output to the user in the form of a paper printout that is based on the digital data in the management server. Alternatively or additionally, information regarding the effected execution of the respective order picking step may be output to the user by means of the data glasses.

Aspects of the inventive method may have the advantage that reliable logging of order picking steps of an order picking process is achieved by arranging corresponding mobile units directly on the extremities of the user. Since the extremities are frequently involved in the removal or depositing of objects by the user, the mobile units come closer to the objects to be picked such that the error rate in identifying order picking steps is reduced. Another essential aspect of the invention is the combination of one or more mobile units carried on the hand/arm and/or foot/leg with the output of information concerning the order picking process by means of data glasses. Due to this combination, a very convenient and reliable support of a manual order picking process is achieved.

The wireless data interface of the mobile unit may be configured differently depending on the respective application. It may be implemented, in particular, in the form of a Bluetooth interface and/or a Wi-Fi/WLAN interface and/or a Zigbee interface. Bluetooth is preferably used if the mobile unit communicates with another device that is respectively carried on the body of the user or carried along by the user (particularly with the aforementioned data glasses). If the mobile unit communicates directly with the management server, the data interface preferably is a Wi-Fi interface.

In a particularly preferred embodiment, information on the manual order picking process is not only output to the user by means of the data glasses, but also a tactile output unit and/or acoustic output unit and/or visual output unit (e.g. a display) in at least one device that is carried along by the user and does not form part of the data glasses, particularly in at least one mobile unit of the number of mobile units. This mobile unit may also be the mobile unit, the sensor device of which acquires the sensor data.

In a preferred variant, the data glasses communicate wirelessly with the mobile unit, the sensor device of which acquires the sensor data, and/or with the management server. The communication with the mobile unit preferably takes place via Bluetooth and the communication with a management server preferably takes place via Wi-Fi. This wireless communication makes it possible to transmit, e.g., the sensor data or the information on the effected execution of an order picking process, as well as the handling instructions.

In another variant of the inventive method, information on the manual order picking process is not only output to the user by means of the data glasses, but also a stationary output unit in the environment of the user. This stationary output unit particularly is a visual output unit (e.g. a display). Multiple stationary output units are preferably arranged in the space, in which the order picking process takes place. The corresponding information on the manual order picking process is then shown on the output unit, the output of which is visible to the user in his current position.

In a particularly preferred embodiment, the number of mobile units comprises at least one mobile unit that is fastened on a wrist of the user and/or at least one mobile unit that is fastened on an ankle of the user. This ensures a particularly high wearing comfort for the user.

In another preferred embodiment of the inventive method, the mobile unit, the sensor device of which acquires the sensor data, directly transmits the data that is based on the sensor data of the sensor device to the management server via the wireless data interface. Alternatively or additionally, the mobile unit, the sensor device of which acquires the sensor data, initially transmits the data that is based on the sensor data of the sensor device to a device carried by the user (preferably the above-described data glasses) via the wireless interface, wherein the device carried by the user subsequently transmits information to the management server, based on which the management server is informed of the effected execution of the respective order picking step.

In another embodiment of the inventive method, the sensor device of the mobile unit comprises a reader that respectively acquires or reads out in a contactless manner sensor data in the form of a code on the object or objects to be removed or deposited or at the removal or depositing location of the object or objects to be removed or deposited. In a variant, the reader is a transponder reader that reads out the code of an RFID transponder, preferably a passive RFID transponder. Alternatively, the reader may also be an optical scanner (particularly a camera) that scans a visual code, e.g. a scanner for scanning a barcode or a QR code. A high reliability in detecting executed order picking steps is achieved with this variant of the invention.

In another variant of the inventive method, the sensor device of the mobile unit comprises a device that acquires sensor data in the form of a plurality of characteristics, which particularly comprise the contour, preferably the 3D contour, of the object or objects to be removed or deposited or of the removal or depositing location of the object or objects to be removed or deposited, wherein the device is preferably a camera such as, e.g., a depth sensor and/or infrared sensor camera.

In another preferred embodiment of the inventive method, the sensor device comprises an inertial measuring unit and/or an optosensory measuring unit (preferably a camera such as a thermal imaging camera/infrared camera) and/or a sensor for localization via a wireless network (e.g. via a local wireless network, particularly WLAN) and/or a sensor for satellite-assisted localization (e.g. based on GPS or GLO-NASS or Galileo). In this case, the effected execution of the respective order picking step is determined by matching the sensor data of the inertial measuring unit and/or the optosensory measuring unit and/or the sensor for localization via a wireless network and/or the sensor for satellite-assisted localization with a digital model, wherein the digital model specifies the spatial positions of storage locations for objects in the space, in which the order picking process takes place. This variant of the invention has the advantage that it involves little logistical effort because no codes or transponders have to be arranged on the objects or the storage locations, respectively. The aforementioned inertial measuring unit is a device that comprises one or more gyroscopes and/or one or more acceleration sensors and preferably also a compass. Measuring units of this type are generally known from the prior art.

In another variant of the inventive method, it is detected when an effected execution of a respective order picking step does not correspond to the pending order picking step or one of the pending order picking steps according to the digital data of the handling instructions, whereupon one or more predefined actions are carried out. A warning message is preferably output to the user with the aid of an output means.

This output means may correspond to the above-described output means.

In another variant of the inventive method, a detection device in a mobile unit of the number of mobile units, particularly in the mobile unit, the sensor device of which acquires the sensor data, detects information concerning the motion and/or acceleration of the mobile unit, the sensor device of which acquires the sensor data, and/or information on the environment of this mobile unit. The detection device therefore represents an additional sensor device. In a preferred embodiment, the detection device comprises an inertial measuring unit and/or a pedometer and/or a temperature sensor and/or a humidity sensor and/or an air pressure sensor and/or a light sensor for measuring the luminosity and/or a sensor for localization by means of a wireless network and/or a sensor for satellite-assisted localization and/or a camera (e.g. a thermal imaging camera/infrared camera).

In an embodiment of the invention, the detected information of the detection device is used for determining when the distance between the mobile unit, the sensor device of which acquires the sensor data, and the storage location of the pending order picking step according to the digital data of the handling instructions is shorter than a predefined threshold, wherein the sensor device is always activated only as long as this distance remains below the predefined threshold. This prevents false detections of storage locations, in which no objects are deposited or removed.

In another embodiment of the invention, the distance between the mobile unit, the sensor device of which acquires the sensor data, and the storage location of the pending order picking step according to the digital data of the handling instructions is determined based on the detected information of the detection device and the range of the sensor device, which is a contactless sensor device, is varied in dependence on this distance. As the distance decreases, the range is preferably reduced in a predefined domain of the distance. A reliable determination of order picking steps is thereby achieved.

In addition to the above-described method, another aspect of the invention also pertains to a system for technically supporting a manual order picking process, wherein a user executes order picking steps, which are output to the user in the form of handling instructions, in the course of the manual order picking process, wherein one or more order picking steps respectively specify the removal of one or more objects from at least one storage location by the user and/or wherein one or more order picking steps respectively specify the depositing of one or more objects in at least one storage location by the user. This system comprises:

data glasses and a number of mobile units, wherein a respective mobile unit comprises a sensor device and a fastening means for fastening the respective mobile unit on an arm and/or on a hand and/or on a foot and/or on a leg of the user;

a management server for managing the manual order picking process, wherein the handling instructions originate from the management server and are stored therein in the form of digital data.

An aspect of the inventive system is configured for carrying out a method, in which     the sensor device in a mobile unit of the number of mobile units acquires sensor data, based on which the effected execution of a respective order picking step is determined, wherein a respective mobile unit of the number of mobile units is carried on an arm or on a hand or on a foot or on a leg of the user with the aid of the fastening means of the respective mobile unit;

data that is based on the sensor data of the sensor device is transmitted via a wireless data interface of the mobile unit, whereupon the management server is informed of the effected execution of the respective order picking step;

information on the manual order picking process is output to the user in an at least partially visual manner by means of data glasses.

An aspect of the inventive system is preferably configured for carrying out one or more preferred variants of the inventive method.

An aspect of the invention furthermore pertains to a mobile unit that comprises a sensor device and a fastening means for fastening the mobile unit on an arm and/or on a hand and/or on a foot and/or on a leg of a user, wherein the mobile unit is respectively configured for use in the inventive method or in one or more preferred embodiments of the inventive method. In other words, the mobile unit contains corresponding means for respectively carrying out the inventive method or preferred variants of the inventive method insofar as the corresponding variants concern functions of the mobile unit.

BRIEF DESCRIPTION OF THE DRAWINGS

Exemplary embodiments of the invention are described in greater detail below with reference to the attached figures.

In these figures.

DETAILED DESCRIPTION

Figure 1:
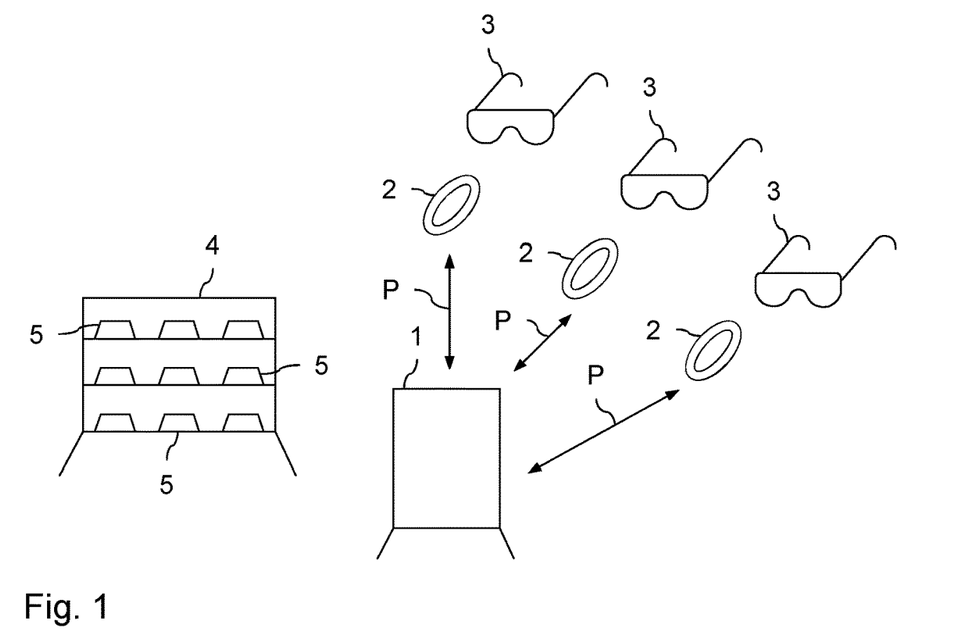
FIG. 1 shows a schematic view of a system for carrying out an embodiment of the inventive method.
Figure 2:
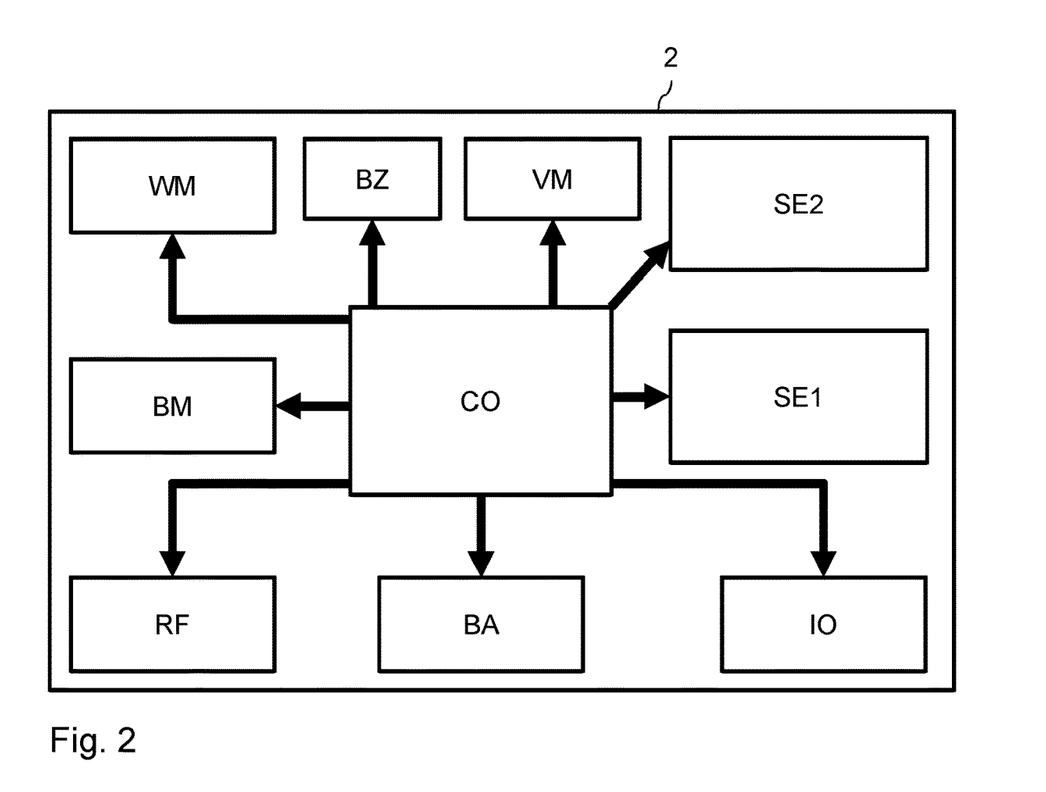
FIG. 2 shows a schematic view of the components of a sensor wristband used in a variant of the inventive method.
Figure 3:
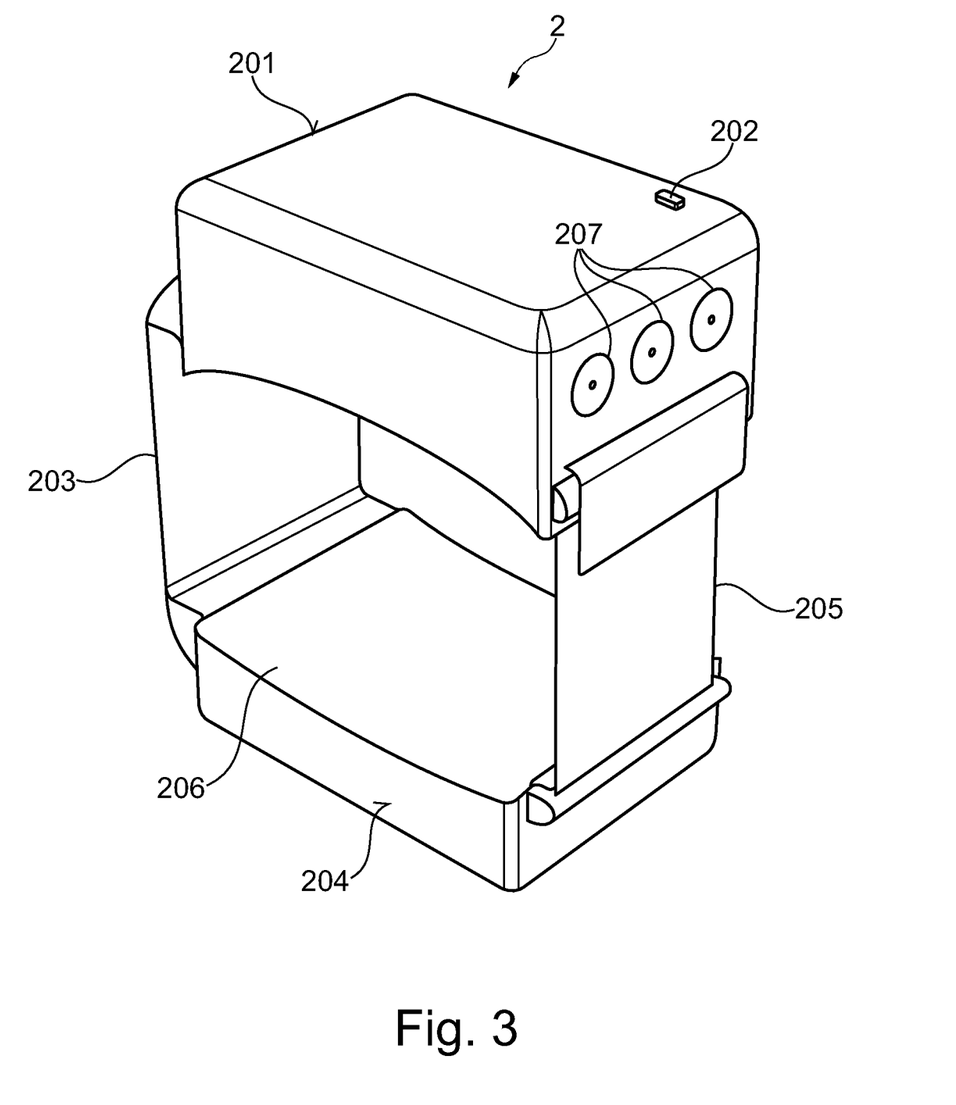
FIGS. 3 and 4 show perspective views that elucidate the external design of two embodiments of a sensor wristband suitable for use in the inventive method.
Figure 4:
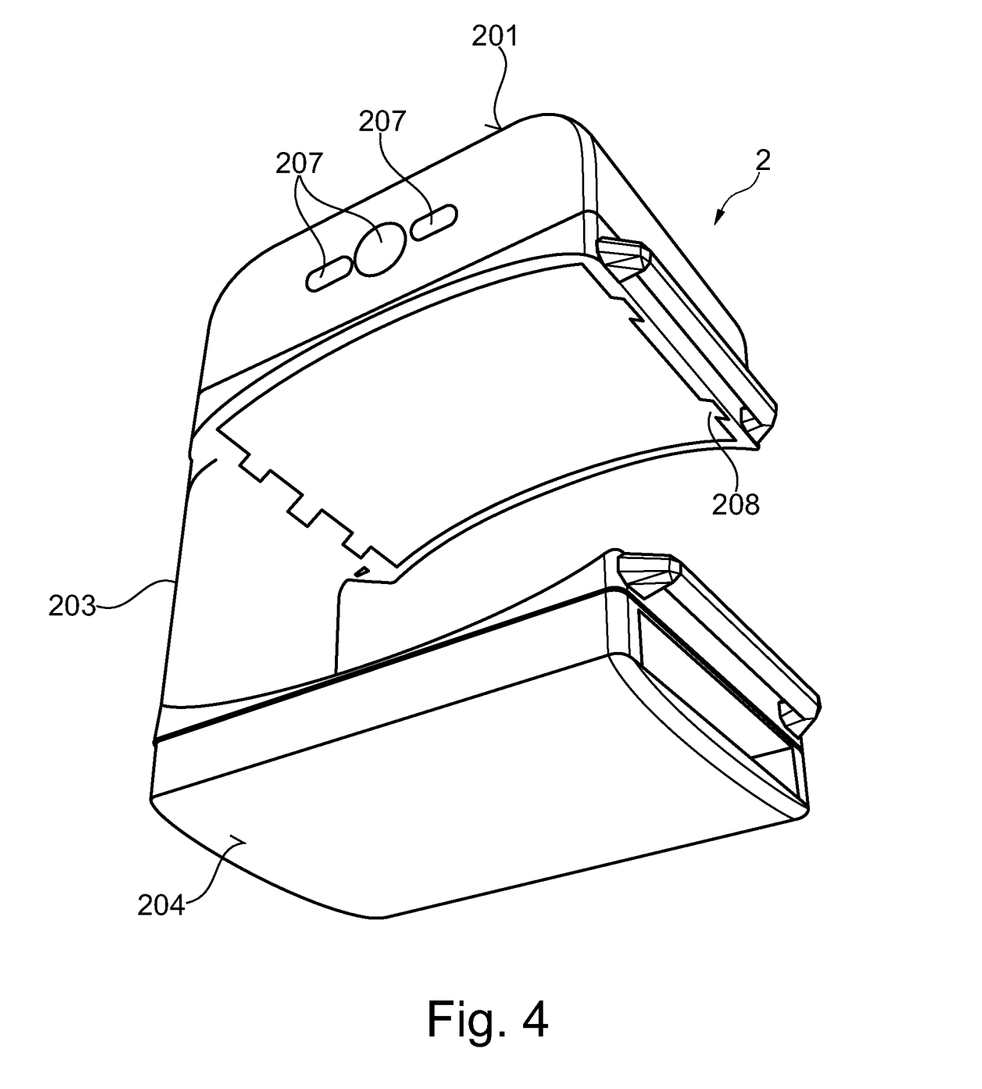

FIG. 1 schematically shows a system, by means of which a variant of the inventive method is carried out. The system comprises a central server 1 for managing order picking processes that can be executed by multiple users in a predefined space, e.g. a warehouse. For this purpose, each user carries on his wrist a mobile unit in the form of a sensor wristband 2 that is only indicated schematically in this figure. FIGS. 2-4 show potential designs of the sensor wristband in greater detail. Furthermore, each user carries data glasses 3, by means of which visual information on the order picking process to be executed is displayed to the respective user in the form of a projection. FIG. 1 shows three sensor wristbands and data glasses, i.e. three users are currently executing order picking processes. However, this number is only used as an example and a significantly larger number of users may also execute a corresponding order picking process.

In the course of the individual order picking processes, the sensor wristband 2 and the data glasses 3 communicate with the management server 1 as indicated with double arrows P. In the presently described exemplary embodiment, the communication between the sensor wristband 2 and the management server 1 takes place via Wi-Fi. The individual data glasses 3 likewise communicate with the server 1 via Wi-Fi. However, it would also be possible, for example, that the individual sensor wristbands communicate with the data glasses of the corresponding user via Bluetooth and the data glasses are in turn communicatively linked to the management server.

The information on the individual order picking processes to be executed is stored on the management server 1 and transmitted from this management server to the individual data glasses 3 of the users in the form of handling instructions. In this case, each handling instruction concerns an order picking step to be executed, according to which the user should respectively remove or deposit certain objects 5 from/in a shelf 4. Depending on the configuration, all order picking steps may be transmitted to the data glasses 3 at the beginning of the order picking process. It would likewise be possible to only transmit a few of the order picking steps or individual order picking steps successively if previous order picking steps were executed.

An essential aspect of the presently described system is that the execution of the order picking steps is detected by means of the sensor wristbands 2 carried by the user. For this purpose, a reader RF (see FIG. 2) is integrated into the sensor wristband 2 in the presently described embodiment. This reader detects corresponding RFID transponders on the objects to be respectively deposited in or removed from the corresponding storage location when the user approaches the objects with his hand. Consequently, the effected execution of an order picking step can be determined based on the detected number of removed or deposited objects. It is also possible to determine, in particular, if the executed order picking step corresponds to the handling instruction displayed by the data glasses. If the sensor wristband 2 detects that an order picking step was correctly executed in accordance with the handling instruction, this wristband wirelessly transmits a message concerning the correct execution of the order picking step to the server 1. In addition, the user may also receive a corresponding message on an output unit in the sensor wristband 2 or on the data glasses 3, respectively.

The detection of the individual order picking steps can, if applicable, also be achieved by means of one individual RFID transponder at a respective storage location. In this case, it is assumed that the user actually removes or deposits the required number of objects in accordance with the handling instructions upon detection of the transponder at the storage location. Alternatively, the order picking steps may also be divided into individual steps for respectively removing or depositing only one object.

The monitoring of an order picking process by means of sensor wristbands worn on the wrist has the significant advantage that the individual order picking steps can thereby be detected very accurately and with a low error rate. The user may also carry two sensor wristbands on both wrists and, if so required, one or more additional sensor wristbands on his ankles. In this way, the error rate in detecting the order picking steps is additionally reduced because more units are available for the detection of the order picking steps.

As already mentioned above, the central management server 1 is informed of the correct execution of an order picking step. The management server 1 is likewise informed of an incorrectly executed order picking step, e.g. depositing or removing incorrect objects or too many or too few objects. The user furthermore receives feedback on an incorrectly executed order picking step in the form of a signal output on the sensor wristband and/or on the data glasses. The signal output may take place optically, acoustically or in the form of vibrations. However, other types of signal outputs such as slight electrical stimuli are also conceivable.

Apart from the RFID reader RF, the sensor wristband 2 comprises additional sensors SE1 and SE2 that are described in greater detail below with reference to FIG. 2. In a variant, it is determined if the sensor wristband or the user is respectively located in the vicinity of the storage location, at which the next order picking step has to be executed, based on location information and/or corresponding acceleration values of these additional sensors. The RFID reader is only activated if this is the case. Otherwise, the device remains deactivated. False readings of RFID transponders can thereby be prevented. Sensor data of the additional sensors generally makes it possible to draw conclusions on the whereabouts or the activity of the user (e.g. order picking, running, standing, bending or the like).

FIG. 2 schematically shows an embodiment of the sensor wristband according to FIG. 1. The sensor wristband comprises a microprocessor unit in the form of a controller CO that is coupled to components of the sensor wristband 2 by means of different interfaces indicated with arrows. The controller CO particularly is coupled to the RFID reader RF, which detects the presence of RFID transponders for registering the individual order picking steps, via a serial interface. The controller CO also comprises an SPI-interface with a Bluetooth module BM, by means of which the sensor wristband can communicate with the data glasses 3. In addition, the controller CO is connected to a Wi-Fi module WM for the wireless communication with the management server 1 via a serial interface. The controller CO furthermore comprises a buzzer BZ and a vibratory motor VM, which are coupled to the controller CO via digital interfaces. In this way, information on the order picking process, e.g. warning messages regarding an incorrectly executed order picking step, can be output to the user. Furthermore, the controller CO is coupled to inputs/outputs IO via a digital interface in order to thereby communicate with an LED and with control buttons on the housing of the sensor wristband.

The sensor wristband 2 furthermore comprises the aforementioned additional sensors SE1 and SE2. Different types of sensors may be provided depending on the configuration of the sensor wristband. The sensor SE1 particularly may comprise an inertial measuring unit and/or a pedometer and/or a barcode scanner. The sensors SE2 may comprise, e.g., a temperature sensor and/or a humidity sensor and/or an air pressure sensor and/or a light sensor for luminosity detection. The sensors SE1 and SE2 may be coupled to the controller CO via different interfaces, e.g. an analog interface, a digital interface, a serial interface, an SPI-interface and the like. The sensor wristband 2 furthermore comprises a battery BA with corresponding charging electronics that are likewise coupled to the controller CO.

In order to increase the order picking speed, the object to be picked furthermore can be explicitly displayed on the data glasses 3 or another display device carried along by the user in the course of the order picking process. In this case, the display shows an image of the object and/or a designation of the object in the form of a unique alphanumeric character sequence (e.g. article number), as well as its quantity to be removed or deposited. The central management server 1 is preferably capable of adapting and thereby optimizing the graphic output to/for the display device used. In the case of a voice output, information regarding the object to be removed or deposited, as well as its quantity, is output in an acoustic manner.

In another variant, the position of the object to be currently removed, as well as the position of the object to be removed next, can be displayed on the data glasses 3. The user therefore has the option, e.g., of parking an order picking cart, which is required in the order picking process and on which the goods for an order picking process are collected, between two removal locations in order to thereby reduce the handling effort and the walking distances.

At the beginning of an order picking process, the user or order picker applies the sensor wristband or sensor wristbands 2 and identifies himself to the system. This may be implemented, e.g., with an employee-specific RFID transponder or with a key sequence, which the user can input with physical keys on a mobile device, particularly also on an applied sensor wristband. Alternatively, the key sequence can be input with virtual keys that are shown, e.g., on the data glasses or another mobile device. If virtual keys are shown on data glasses, the corresponding key input can be initiated, e.g., with gestures. Apart from the data glasses, the detection of gestures by means of a corresponding sensor system is also required in this case.

FIG. 3 shows a perspective view of a concrete embodiment of an inventive sensor wristband 2. FIG. 3 and FIG. 4 merely show examples and the sensor wristband may also be configured differently. The sensor wristband comprises an upper housing part 201, in which the entire sensor system of the wristband except for the RFID antenna of the RFID reader RF is installed. The upper housing part furthermore contains the controller CO, the buzzer BZ and the vibratory motor VM, as well as the Wi-Fi module WM and the Bluetooth module BM. In addition, an LED 202 for indicating the operating state of the sensor wristband is installed in the upper housing part 201. A (primary) accumulator for the power supply of the components of the sensor wristband is also located in the upper housing part. Furthermore, three control buttons 207 are provided on the end face of the upper housing part and enable the user to perform different control functions, e.g. turning on the device and confirming an order picking step.

The upper housing part is connected to a lower housing part 204 by means of a bendable bracket 203. The RFID antenna of the RFID reader is located in the lower housing part 204. Furthermore, an additional (secondary) accumulator is installed in this housing part and put into operation once the primary accumulator in the upper housing part no longer supplies power. The operating time of the sensor wristband is thereby extended. The accumulator and the RFID antenna in the lower housing part 204 are connected to the components in the upper housing part by means of corresponding (not-shown) lines in the bracket 203. An upper cover 206 of the lower housing part 204 can be opened in order to remove the secondary accumulator from this housing part.

A Velcro strap 205 is fastened on the right edges of the upper and lower housing parts with the aid of slots and makes it possible to fix the sensor wristband on the wrist of the user. For this purpose, the user inserts his hand through the intermediate space between the upper housing part 201 and the lower housing part 204 and tightens the Velcro strap 205. This leads to slight bending of the bracket 203 and thereby fixes the sensor wristband on the wrist.

FIG. 4 shows a perspective view of a modified embodiment of a sensor wristband, in which the Velcro strap 205 was omitted in order to provide a better overview. The only difference between the sensor wristband according to FIG. 4 and the wristband according to FIG. 3 can be seen in that the control buttons 207 are arranged on a lateral surface of the upper housing part 201. This figure furthermore shows that a housing cover 208 is provided on the underside of the upper housing part 201, wherein this housing cover can be opened in order to remove the primary accumulator from the upper housing part.

The above-described embodiments of the invention have a number of advantages. An improved detection of order picking steps of a manual order picking process is achieved, in particular, due to the utilization of a sensor wristband. This can be attributed to the fact that the sensor wristband is moved very close to the respective objects to be removed or deposited such that a more accurate detection of the removal or depositing operation is achieved. Another advantage of the invention can be seen in that data glasses are used in addition to one or more sensor wristbands. These data glasses make it possible to directly show the user information on the order picking process in his field of vision.

The invention claimed is:

1. A method for technically supporting a manual order picking process, wherein a user executes order picking steps, which are output to the user as handling instructions during the manual order picking process, wherein the handling instructions originate from a management server for managing the manual order picking process and are stored therein as digital data, wherein one or more order picking steps specify one or more objects being removed from or deposited in at least one storage location by the user comprising:
   acquiring sensor data by a contactless sensor device in a mobile unit of a number of mobile units, wherein, based on the sensor data, effected execution of a respective order picking step is determined, wherein a respective mobile unit of the number of mobile units is carried on an arm or on a hand or on a foot or on a leg of the user via a fastening means of the respective mobile unit;

reducing a range of the contactless sensor device in a predefined domain of a distance between the mobile unit and a storage location of a pending order picking step, as the distance decreases;

transmitting data that is based on the sensor data of the contactless sensor device, whereupon the management server is informed of the effected execution of the respective order picking step; and outputting information on the manual order picking process to the user in an at least partially visual manner by data glasses, wherein the handling instructions are output to the user by the data glasses, wherein the handling instructions are transmitted from the management server to the data glasses, and wherein information regarding the effected execution of the respective order picking step is output to the user by the data glasses.

2. The method according to claim 1, wherein the handling instructions, including a handling instruction to be currently executed, are output to the user by the data glasses simultaneously with one or more ensuing handling instructions.

3. The method according to claim 1, wherein the information on the manual order picking process is additionally output to the user by at least one of a tactile output unit or an acoustic output unit or a visual output unit in at least one device that is carried along by the user and does not form part of the data glasses, in at least one mobile unit of the number of mobile units.

4. The method according to claim 1, wherein the data glasses communicate wirelessly with at least one of the management server or the mobile unit, wherein the contactless sensor device of the mobile unit acquires the sensor data.

5. The method according to claim 1, wherein the information on the manual order picking process is additionally output to the user by a stationary output unit in an environment of the user.

6. The method according to claim 1, wherein the number of mobile units comprises at least one mobile unit that is fastened on a wrist or an ankle of the user.

7. The method according to claim 1, wherein transmitting the data that is based on the sensor data comprises:
the mobile unit directly transmitting the data to the management server via a wireless data interfaces; or
the mobile unit initially transmitting the data to a device carried by the user, via the wireless interface, wherein the device carried by the user subsequently transmits information based on the data to the management server.

8. The method according to claim 1, wherein the contactless sensor device comprises a reader that reads out in a contactless manner the sensor data as a code on the one or more objects to be removed or deposited or at a removal or depositing location of the one or more objects to be removed or deposited, wherein the reader comprises a transponder reader that reads out the code of an RFID transponder or an optical scanner that scans a visual code.

9. The method according to claim 1, wherein the contactless sensor device comprises a device that acquires in a contactless manner sensor data as a plurality of characteristics comprising a contour of the one or more objects to be removed or deposited or of a removal or depositing location of the one or more objects to be removed or deposited, wherein the device comprises a camera.

10. The method according to claim 1, wherein the contactless sensor device comprises an inertial measuring unit and at least one of an optosensory measuring unit or a sensor for localization via a wireless network or a sensor for satellite-assisted localization, wherein the effected execution of the respective order picking step is determined by matching the sensor data of the inertial measuring unit and at least one of the optosensory measuring unit or the sensor for localization via a wireless network or the sensor for satellite-assisted localization with a digital model, wherein the digital model specifies spatial positions of storage locations for the one or more objects in a space in which the manual order picking process takes place.

11. The method according to claim 1, further comprising detecting when the effected execution of the respective order picking step does not correspond to the pending order picking step or one of a plurality of pending order picking steps according to the digital data of the handling instructions, whereupon one or more predefined actions are carried out.

12. The method according to claim 1, further comprising detecting, by a detection device in the mobile unit, information concerning at least one of a motion or an acceleration of the mobile unit or information on an environment of the mobile unit.

13. The method according to claim 12, wherein the detection device comprises at least one of an inertial measuring unit, a pedometer, a temperature sensor, a humidity sensor, an air pressure sensor, a light sensor for measuring a luminosity, a sensor for localization by a wireless network, a sensor for satellite-assisted localization, or a camera.

14. The method according to claim 12, further comprising determining, using the detected information of the detection device, when the distance between the mobile unit and the storage location of the pending order picking step according to the digital data of the handling instructions is shorter than a predefined threshold, wherein the contactless sensor device is activated only as long as the distance remains below the predefined threshold.

15. The method according to claim 14, wherein determining the distance between the mobile unit and the storage location of the pending order picking step comprises determining based on the detected information of the detection device.

16. A system for technically supporting a manual order picking process, wherein a user executes order picking steps, which are output to the user as handling instructions during the manual order picking process, wherein one or more order picking steps specify one or more objects being removed from or deposited in at least one storage location by the user, wherein the system comprises:
data glasses;
a number of mobile units, wherein a respective mobile unit comprises a contactless sensor device and a fastening configured to fasten the respective mobile unit on at least one of an arm or on a hand or on a foot or on a leg of the user;
a management server configured to manage the manual order picking process, and configured to originate the handling instructions, which are stored at the management server as digital data;
wherein the contactless sensor device in the respective mobile unit of the number of mobile units is configured to acquire sensor data, based on which effected execution of a respective order picking step is determined;
wherein a range of the contactless sensor device is reduced in a predefined domain of a distance between the mobile unit and a storage location of a pending order picking step, as the distance decreases;

wherein the respective mobile unit includes a wireless data interface configured to transmit data that is based on the sensor data of the contactless sensor device, whereupon the management server is informed of the effected execution of the respective order picking step; and wherein the data glasses are configured to output information on the manual order picking process to the user in an at least partially visual manner, wherein the handling instructions are output to the user by the data glasses, wherein the handling instructions are transmitted from the management server to the data glasses, and wherein information regarding the effected execution of the respective order picking step is output to the user by the data glasses.

17. The system according to claim 16, wherein the handling instructions, including a handling instruction to be currently executed, are output to the user by the data glasses simultaneously with one or more ensuing handling instructions.

* * * * *